(12) United States Patent
Perras (10) Patent No.: US 6,999,435 B2
(45) Date of Patent: Feb. 14, 2006

(54) METHOD, SYSTEM AND NODE FOR PROVIDING ENHANCED MOBILITY IN SIMPLE IP TELECOMMUNICATION NETWORKS WHEN PERFORMING L2TP TUNNELING

(75) Inventor: Michelle Perras, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 864 days.

(21) Appl. No.: 09/819,740

(22) Filed: Mar. 29, 2001

(65) Prior Publication Data

US 2002/0141369 A1     Oct. 3, 2002

(51) Int. Cl.
*H04J 3/24* (2006.01)

(52) U.S. Cl. ...................... 370/331; 370/349
(58) Field of Classification Search ............. 370/310, 370/328, 331, 352, 437, 349; 455/422.1, 455/432.1, 432.2, 432.3, 433, 435.1, 436
See application file for complete search history.

(56) References Cited

U.S. PATENT DOCUMENTS 6,522,880 B1 * 2/2003 Verma et al. ............... 455/436

OTHER PUBLICATIONS

W. Townsley et al., Internet standards track protocol, Network Working Group, RFC 2661,"Layer Two Tunneling Protocol L2TP", Aug. 1999.

TR45, Wireless IP Network Standard, TIA/EIA/IS-835, Jun. 2000.

* cited by examiner

*Primary Examiner*—Ricky Ngo
*Assistant Examiner*—Derrick W Ferris
(74) *Attorney, Agent, or Firm*—Sandra Beauchesne, Ericsson Canada Inc.

(57) ABSTRACT

The present invention relates to a method, system and node for providing enhanced mobility in Simple IP telecommunication networks when performing L2TP tunneling. A mobile station establishes a connection with a first service node in the telecommunication network. This connection is then extended from the first service node to an endpoint, or terminal node, in the telecommunication network. Upon an establishment of a connection between the mobile station and the terminal node via the first service node, a unique address is assigned to the mobile station at the terminal node. Upon roaming of the mobile station from the coverage area of the first service node to that of a second service node in the telecommunication network, continuous connectivity is ensured between the mobile station and the terminal node by establishing a new connection between the mobile station and the second service node, and extending the established new connection from the second service node to the terminal node. Upon an establishment of a new connection between the mobile station and the terminal node via the second service node, the unique address is re-assigned to the mobile station at the terminal node. The connection between the mobile station and the terminal node via the first service node is then terminated.

24 Claims, 7 Drawing Sheets

METHOD, SYSTEM AND NODE FOR PROVIDING ENHANCED MOBILITY IN SIMPLE IP TELECOMMUNICATION NETWORKS WHEN PERFORMING L2TP TUNNELING

BACKGROUND OF THE INVENTION

1. Technical Field of the Invention

This invention relates to mobile services in telecommunication networks and, more particularly, to a method of performing enhanced mobility management for mobile stations in Simple IP telecommunication networks when performing Layer 2 Tunneling Protocol (L2TP) tunneling.

2. Description of Related Art

Modern telecommunication networks allow mobile subscribers to benefit from a vast array of services. In the field of wireless communications for instance, mobile stations support a wide variety of applications through which mobile subscribers, in addition to having conversations, can send text or vocal messages to other subscribers, and surf on the Internet.

The essence of mobile services hence lies in the opportunity for mobile subscribers to benefit at all times from the aforementioned services, regardless of location within the coverage area of the telecommunication network. To guarantee adequate service provision, telecommunication network operators must consequently ensure that their equipment is configured efficiently, such that connections established between the mobile stations and service nodes in the telecommunication network are appropriately monitored and maintained.

Several methods have been developed to manage the procedures following which the service nodes in a telecommunication network cooperate in handling the connections established between said service nodes in the telecommunication network and mobile stations. These procedures, or algorithms regulating the functionality of the service nodes, hold great importance as they are intimately linked to the quality of services provided to subscribers.

Mobile subscribers indeed expect to be able to communicate amongst themselves, and benefit from data transfer services which have been subscribed to, without any significant disturbance or malfunction affecting the quality of said services: a sudden interruption or termination of an ongoing communication session due to loss of information in the telecommunication network, or excessive signal attenuation rendering use of the mobile station inadequate within the coverage area of the telecommunication network.

Protocols have thus been defined in a quest to develop the most efficient procedures possible to manage exchanges of information between mobile stations and telecommunication networks. Mobile IP is one of those protocols aiming at providing mobile stations with efficient service provision.

Mobile IP is a protocol relating to the management of mobile station addresses in telecommunication networks, whereby two IP addresses are associated with a mobile station: a fixed IP address (home address) and a "care-of" IP address that changes at each new "point of attachment". The fixed IP address is assigned to the mobile station upon registering in the telecommunication network it subscribes to (home telecommunication network). Upon the establishment of a connection with a foreign telecommunication network, the mobile station registers as well with a Home Agent (HA) node in the telecommunication network. The HA stores the mobile station's fixed IP address and associates the latter with an IP "point-of-attachment address", which is an indicator of the IP address of the telecommunication network within which the mobile station is currently located. The HA manages this IP "point-of-attachment" address.

Every time the mobile station transits from the coverage area of a first telecommunication network to that of a second telecommunication network, the mobile station performs a new registration with the foreign telecommunication network and as well with the HA. During this new registration, the HA updates the mobile station's IP "point-of attachment" address, such as to reflect the address of the foreign telecommunication network.

The HA then collects in the mobile station's home telecommunication network the packets intended for the mobile station from the delivery point associated with the mobile station's fixed IP address and home IP "point-of-attachment" address; the HA forwards these packets to the appropriate delivery point associated with the mobile station's fixed IP address and new "point-of-attachment address" in the foreign telecommunication network, thereby ensuring proper delivery.

In this fashion, upon registering in the foreign telecommunication network, the mobile station is not assigned a new local IP address but rather retains ownership of its fixed IP address. The mobile station may at all times be reached with this fixed IP address since the HA takes care to update the mobile station's "point-of-attachment address" and to forward information intended for the mobile station from the mobile station's home telecommunication network to the visited telecommunication network.

Simple IP is another protocol aiming at an efficient management of mobile subscriber mobility and effective service provision in a telecommunication network. Simple IP enables the establishment of a tunneled connection between a service node and an endpoint, or terminal node, in the telecommunication network, such that they may exchange information. This can be performed to establish an end-to-end connection from the mobile station to the terminal node. Once the tunnel is established between the service node and the terminal node, the service node from thereon acts as a transparent router, simply forwarding information exchanged between the mobile station and the terminal node.

The benefits of tunneling reside in that they for one allow the establishment of virtual private networks (VPNs) between two points in the telecommunication network, and also allow the processing of packets to be independent from the nature of the tunnel endpoints.

Despite the aforementioned tunneling advantages, the current Simple IP protocol nonetheless presents inadequacies, as undesired events affecting the quality of service provision to mobile stations can possibly occur. Indeed, depending on how service nodes in telecommunication networks relay each other in handling the connections established with the mobile stations as the latter transit from the coverage area of a service node to that of another, the quality of service provision may find itself degraded, as a result of which communication, or data transfer services, may be lost.

In accordance with the current Simple IP protocol, an address is assigned to the mobile station upon the establishment of a connection between the mobile station and the terminal node via a first service node. However, if the mobile station transits from the coverage area of the first service node to that of a second service node in the telecommunication network, the information sent by the terminal node to the mobile station via the first service node is lost, as the mobile station is no longer connected to said first service node. In other words, the use of an erroneous point of attachment is made, such that loss of data ensues in such a scenario.

Moreover, the connection established between the mobile station and the terminal node via the first service node is not immediately removed at once following the transiting of the mobile station from the coverage area of the first service node to that of the second service node, which results in inefficient bandwidth management. Indeed, this connection is only removed upon the expiry of a connection timeout, when no information has been sent over the connection for a pre-determined time interval.

In order to overcome the present flaws of the Simple IP protocol in the context of L2TP tunneling, it would be advantageous to have a method whereby subscribers could benefit from service provision of optimal quality without being subject to service failure, regardless of their location in the telecommunication network. It would be practical to have a procedure whereby service nodes and terminal nodes in the telecommunication network could cooperate in such a manner as to prevent undesired performance discrepancies, without having to equip current Simple IP telecommunication networks with costly additional nodes such as HAs for performing mobility management. The present invention provides such a system and method.

SUMMARY OF THE INVENTION

In one aspect, the present invention is a method for performing mobility management in a telecommunication network. A mobile station establishes a connection with a first service node in the telecommunication network. This connection is then extended from the first service node to an endpoint, or terminal node, in the telecommunication network. Upon an establishment of a connection between the mobile station and the terminal node via the first service node, a unique address is assigned to the mobile station at the terminal node.

Upon roaming of the mobile station from the coverage area of the first service node to that of a second service node in the telecommunication network, continuous connectivity is ensured between the mobile station and the terminal node by establishing a new connection between the mobile station and the second service node, and extending the established new connection from the second service node to the terminal node. Upon an establishment of a new connection between the mobile station and the terminal node via the second service node, the unique address is re-assigned to the mobile station at the terminal node. The connection between the mobile station and the terminal node via the first service node is then terminated.

In another aspect, the present invention is as well a system for allowing mobility management in a telecommunication network. A mobile station establishes a connection with a first service node in the telecommunication network. The first service node extends this connection to an endpoint, or terminal node, in the telecommunication network. The terminal node assigns a unique address to the mobile station upon the establishment of a connection between the mobile station and the terminal node.

Upon roaming of the mobile station from the coverage area of the first service node to that of a second service node in the telecommunication network, the mobile station establishes a connection with the second service node. The second service node extends the established connection to the terminal node. Upon the establishment of a new connection between the mobile station and the terminal node via the second service node, the terminal node re-assigns the unique address to the mobile station and terminates the connection between the mobile station and the terminal node via the first service node.

In yet another aspect, the present invention introduces a node in a telecommunication network for performing mobility management. The node establishes a connection with a mobile station via a first service node in the telecommunication network and, upon roaming of the mobile station from the coverage area of the first service node to that of a second service node in the telecommunication network, the node establishes a new connection with the mobile station via the second service node.

Prior to establishing said new connection with the mobile station via the second service node, the node verifies whether it is already involved in a previous connection with the mobile station via the first service node. If such is the case, the node reassigns to the mobile station its unique address upon the establishment of the new connection. Otherwise, the node assigns a new unique address to the mobile station upon the establishment of said new connection.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

As total mobility is the very purpose of mobile services, network operators have a responsibility to ensure that their network equipment can efficiently manage the connections established between the network and the mobile stations of subscribers such that at all times the latter may be provided with due quality of service.

Presently, a mobile subscriber of a Simple IP telecommunication network does not benefit from optimal mobility services, as the protocol comports limitations regarding inter-Packet Data Service Node (PDSN) handoffs when Layer 2 Tunneling Protocol (L2TP) tunneling is performed between a PDSN and an endpoint, or terminal node in the telecommunication network. Indeed, once a mobile station transits from the coverage area of a first PDSN linked to a terminal node via a tunnel, to that of a second PDSN, the mobile station is assigned a new address by the terminal node upon the establishment of a new connection with the latter via the second PDSN.

This results in loss of connectivity for the mobile station since information destined to the mobile station is sent to the latter's previous address via the first PDSN and not to the mobile station's new address, via the second PDSN. Moreover, the tunnel established between the first PDSN and the terminal node is not immediately terminated following the transiting of the mobile station from the coverage area of the first PDSN to that of the second PDSN, which constitutes inefficient bandwidth management in the telecommunication network.

The aforementioned loss of connectivity, along with considerations such as a constant or an extended transmission rate, or again a satisfactory signal to noise ratio relating to the efficiency of said transmission, reflect the level of quality of the service the mobile station is being provided with. A mobile subscriber indeed expects to fully enjoy the benefits of services which have been subscribed to when using the mobile station, and said services should moreover be in accordance with the appropriate required level of quality to which the mobile subscriber is entitled to.

A possible solution in order to benefit from enhanced mobility regarding inter-PDSN handoffs in the present context is to adopt a concept similar to that of a HA, as used in Mobile IP telecommunication networks. This however implies the implementation of an additional node (HA) in the telecommunication network, which proves to be costly. Moreover, the terminal node, or endpoint, of a tunnel has no means of recognizing the occurrence of an inter-PDSN handoff, such that said terminal node is unable to terminate a tunneled connection no longer being used by the mobile station having transited to another area and using a new tunneled connection to the terminal node.

The present invention proposes a method avoiding the considerable costs associated with the addition of a HA for performing enhanced mobility management in Simple IP telecommunication networks and as well allows for better bandwidth management.

Figure 1:
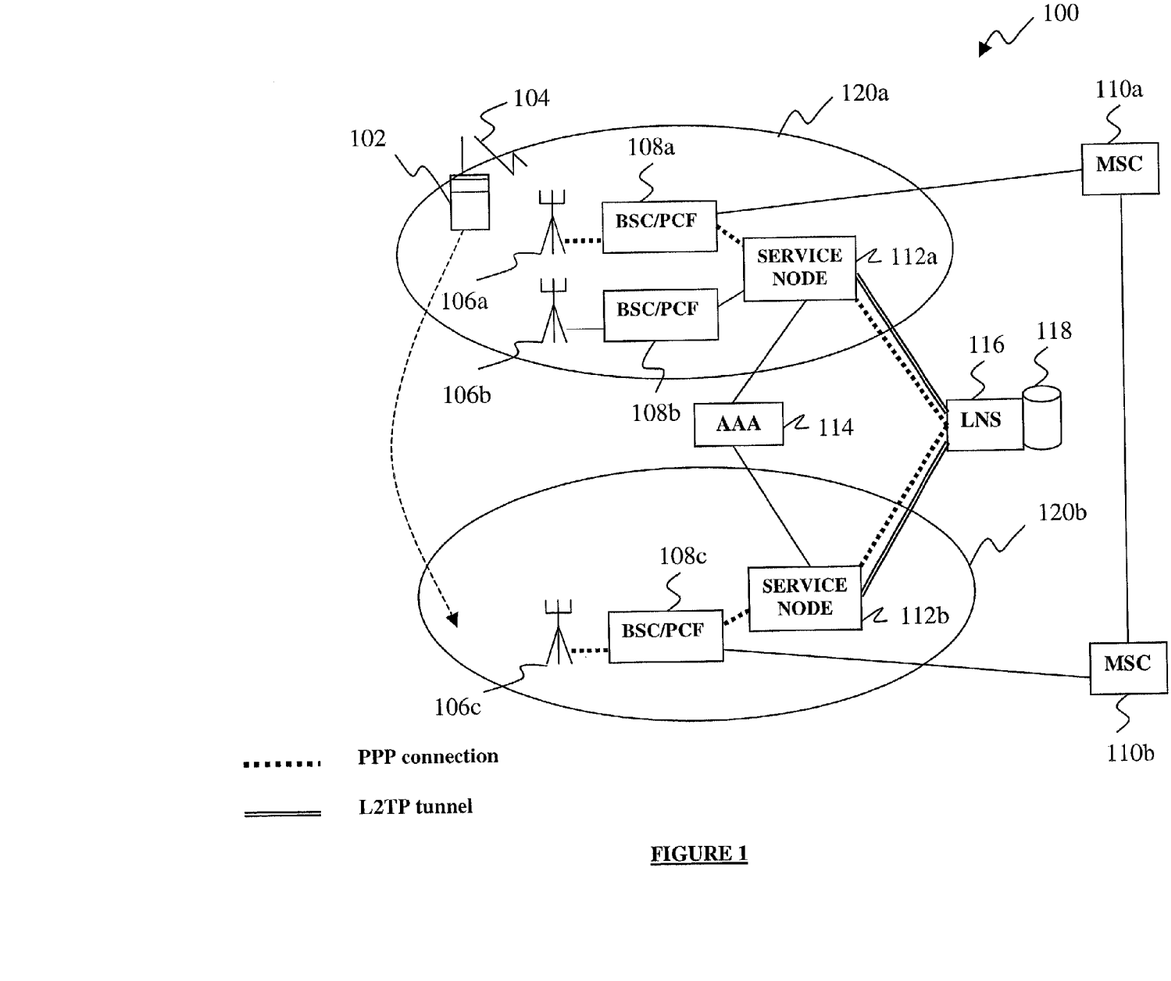
FIG. 1 is a packet data cellular telecommunication network for performing mobility management in accordance with a preferred embodiment of the invention.

Reference is now made to FIG. 1 wherein there is shown a packet data cellular telecommunication network 100 for performing mobility management in accordance with a preferred embodiment of the invention.

A mobile subscriber uses a mobile station 102, such as a mobile phone handset for example, to establish a first radio connection over an air interface 104 with a packet data cellular telecommunication network 100 to benefit from mobile telephony services. This information exchange over the air interface 104 can be regulated by a plurality of communication protocols such as IS-54, IS-95 and IS-136, without being limited thereto.

The packet data cellular telecommunication network 100, of which a simple representation is provided for clarity considerations, thus exchanges information via radio signals with the mobile station 102. To perform such radio communication, the packet data cellular telecommunication network 100 comprises equipment which includes Base Stations (BSs) 106a, 106b and 106c, Base Station Controllers (BSCs) incorporating Packet Control Functions (PCFs) 108a, 108b and 108c, and Mobile Services Switching Centers (MSCs) 110a and 110b.

The BSs 106a, 106b and 106c act as an interface between the mobile station 102 and the packet data cellular telecommunication network 100 equipment by performing two-way communications with the mobile station 102 over the air interface 104. The BSs 106a, 106b and 106c can thus be perceived as the radio access part of the packet data cellular telecommunication network 100.

The BSs 106a, 106b and 106c are further linked to one of the BSCs/PCFs 108a, 108b and 108c. The BSCs/PCFs 108a, 108b and 108c manage the allocation of radio resources by ensuring that the mobile station 102 is adequately assigned a channel, or frequency, for communication with at least one of the BSs 106a, 106b and 106c. The BSCs/PCFs 108a, 108b and 108c act as well as a radio-packet interface, converting the radio signals to digital signals sent to one of the service nodes 112a or 112b in the telecommunication network 100, and vice versa.

While the invention applies preferably to said service nodes 112a and 112b in the context of a Simple IP network, it can alternatively be used in the context of any element in a telecommunication network, such as for example a router, a switch, or any service node, responsible for forwarding data, or information, within said telecommunication network. The latter can in turn be any form of communication network wherein information, or data, is exchanged, and can be a cellular telecommunication network in the context of mobile telephony, a network of computers for exchanging data, a public network such as the Internet or a private corporate network, without being limited thereto.

The terminology "packet data" is used since the digital information, exchanged over the packet data cellular telecommunication network 100, is fragmented into packets. An Internet Protocol (IP) network is a packet data cellular telecommunication network 100 abiding by the aforementioned protocol.

In addition to service nodes 112a and 112b, the BSCs/PCFs 108a, 108b and 108c are as well linked to one of the MSCs 110a and 110b, which may perform switching functions within the packet data cellular telecommunication network 100, and authorize the provision of services to the mobile station 102.

Some standards, like IS-136 for instance, do not explicitly include BSCs/PCFs 108a, 108b and 108c in their network reference models, as the MSCs 110a and 110b can perform extended roles comprising that of the BSCs/PCFs 108a, 108b and 108c. The packet data cellular telecommunication network 100 further comprises databases, or storing units, in which various information relating to mobile subscribers may be stored. These elements have however not been illustrated for reasons of clarity.

Once the mobile station 102 has established over the air interface 104 a connection with the radio equipment of the packet data cellular telecommunication network 100, this connection is further extended to the service node 112a in the packet data cellular telecommunication network 100, so that the subscriber can benefit from requested services supported by the service node 112a for example. In specific network architectures, the service nodes 112a and 112b may be Packet Data Service Nodes (PDSN) in a Code Division Multiple Access (CDMA2000) network, or Inter Working Functions (IWF) in accordance with CDMAone or IS-136 standards.

The service node 112a performs authentication and authorization procedures with an Authentication, Authorization and Accounting (AAA) authority 114 prior to granting the mobile station 102 access to the packet data cellular telecommunication network 100 services. The purpose of authentication resides in preventing unauthorized users from accessing network resources. The AAA 114 can consist in a security server, such as a Remote Authentication Dial-in User Server (RADIUS) for instance, co-located with a database. The latter can be used, for example, to store the usernames and associated passwords for each subscriber.

Figure 2:
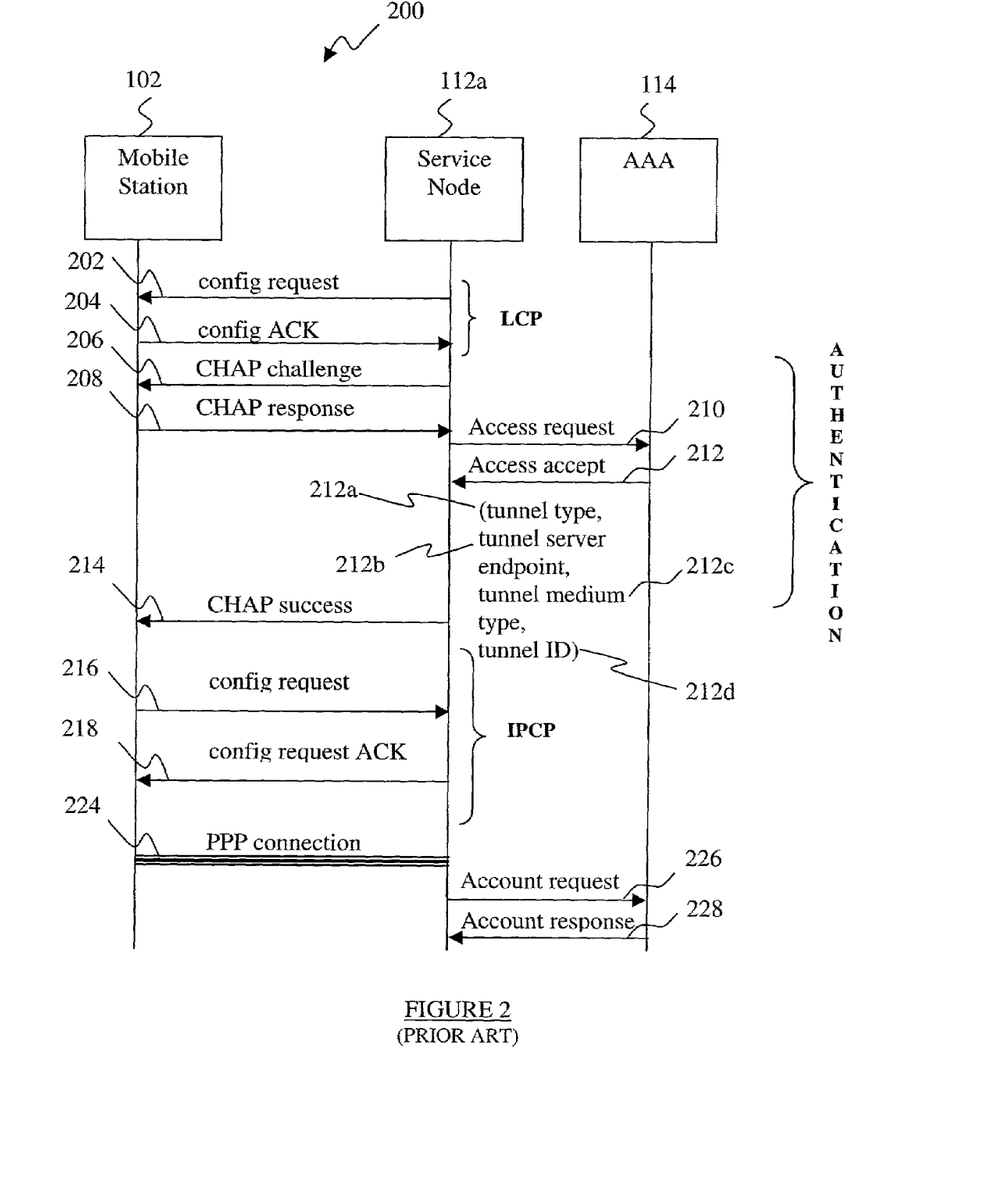
FIG. 2 is a signaling diagram illustrating the establishment of a Point-to-Point Protocol (PPP) connection between a mobile station and a service node in a packet data cellular telecommunication network in accordance with prior art.

Reference is now as well made to FIG. 2, wherein there is shown a signaling diagram illustrating the establishment 200 of a PPP connection between a mobile station and a service node in a packet data cellular telecommunication network in accordance with prior art.

The mobile station 102 and the service node 112a initiate a communication session. The service node 112a sends a "configuration request" message 202 to the mobile station 102 to suggest the use of the Challenge Handshake Authentication Protocol (CHAP). The mobile station 102 accepts the CHAP proposition via an "acknowledge" message 204. This completes the Link Control Protocol (LCP) phase.

The service node 112a then commences the authentication phase by sending a "CHAP challenge" message 206 to the mobile station 102, said message 206 including a code. The mobile station 102 acknowledges via a "CHAP response" message 208 including an encrypted code and a network access identifier (NAI). The service node 112a sends to the AAA 114 an "access request" message 210 including the code, the encrypted code as well as the NAI. Following verifications in the database co-located with the AAA 114, the "access request" message 210 is accepted via an "access accept" message 212. The service node 112a informs the mobile station 102 of the successful authentication by sending the mobile station 102 a "CHAP success" message 214. This completes the authentication phase.

In accordance with prior art, the "access accept" message 212 does not comprise additional information. However, according to a preferred embodiment of the present invention, the "access accept" message 212 includes tunnel establishment parameters 212a, 212b, 212c and 212d, which the service node 112a subsequently uses to establish a tunnel in accordance with the L2TP. These parameters, sent altogether, can be a tunnel (or connection) type parameter 212a, indicative of the type of connection used to establish the tunnel (PPP connection for instance) with respect to the associated protocol, a tunnel server endpoint parameter 212b, indicative of a host name (or an address of a server to be contacted), a tunnel medium type parameter 212c, indicative of the transmission capabilities of said tunnel depending on the connection bearer, and a tunnel (or connection) assignment ID parameter 212d, for identifying said tunnel and the data associated with the latter.

At this point, Internet Protocol Control Protocol (IPCP) negotiation is initiated. The mobile station 102 sends a "configuration request" message 216 to the service node 112a and thereby requests to be assigned an address and as well requests the addresses of a primary and secondary Domain Name Servers (DNSs). The service node 112a thus assigns, via a "configuration request acknowledgement" message 218, an available address to the mobile station 102, said address selected from a pool of addresses, and as well informs the mobile station 102 of the requested DNSs addresses.

This leads to the establishment of a Point-to-Point Protocol (PPP) connection 224 between the mobile station 102 and the service node 112a. Further detail for PPP connection establishment may be obtained from technical specifications manuals such as "IS-835 for CDMA2000 cellular telecommunication networks", herein included by reference.

The service node 112a sending an "account request" message 226 to the AAA 114 initiates the accounting of service provision. The AAA 114 acknowledges the "account request" message 226 with an "account response" message 228.

According to a preferred embodiment of the invention, the mobile subscriber uses a mobile station 102 to establish a first radio connection with a CDMA2000 packet data cellular telecommunication network 100 and then initiates the establishment of a PPP connection with a service node 112a in said network 100.

In accordance with the L2TP, the service node 112a can establish a tunneled connection with an endpoint, or terminal node, in the packet data telecommunication network 100, such as to extend the mobile station's 102 connection to the terminal node, referred to as a L2TP network server (LNS) 116. The LNS 116 terminates L2TP tunnels and provides PPP and network termination.

Figure 3:
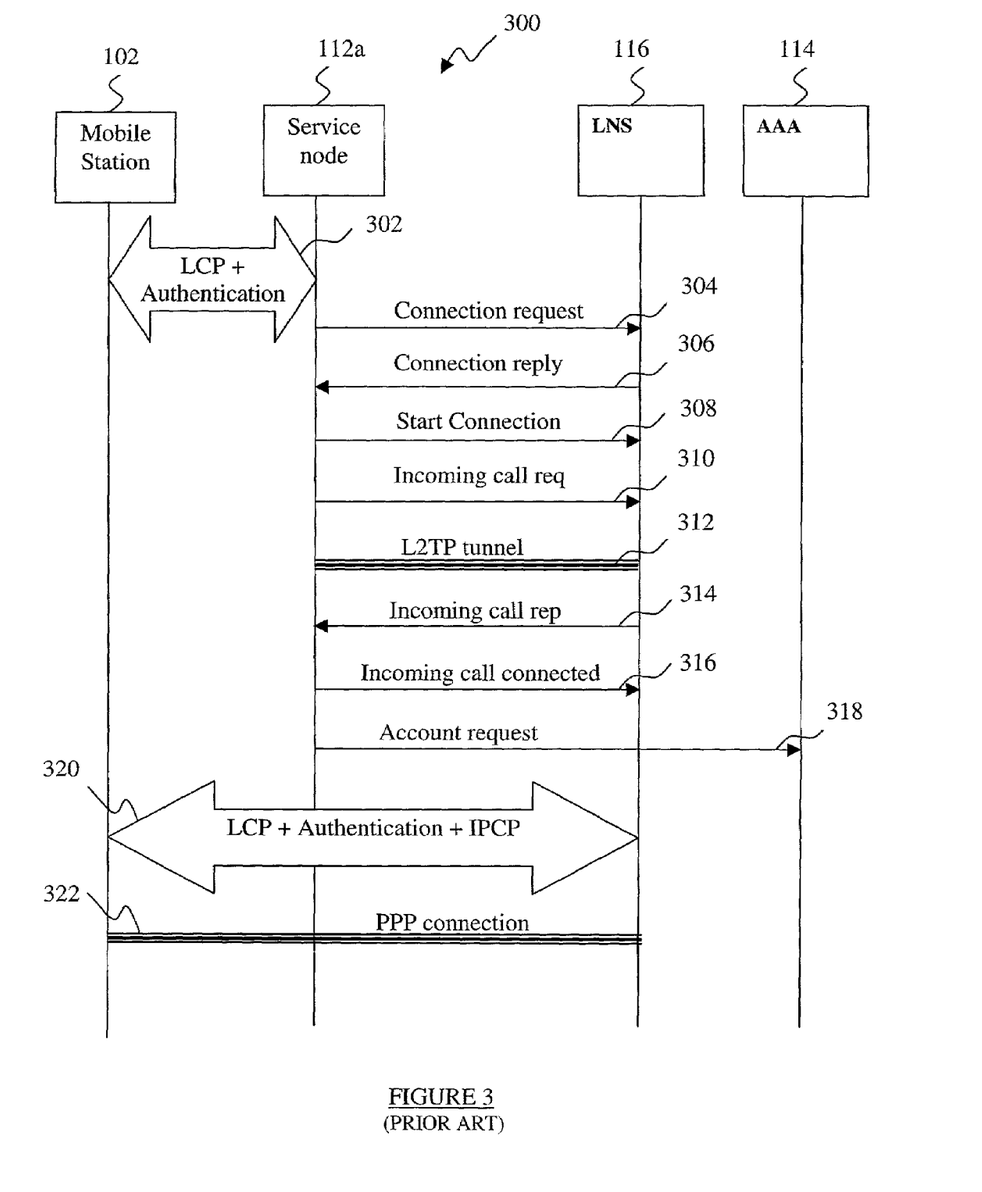
FIG. 3 is a signaling diagram illustrating the establishment of a tunneled PPP connection between a mobile station and a terminal node in a packet data cellular telecommunication network in accordance with prior art.

Reference is now made to FIG. 3, wherein is depicted a signaling diagram illustrating the establishment 300 of a tunneled PPP connection between a mobile station and a terminal node in a packet data cellular telecommunication in accordance with prior art.

The mobile station 102 and the service node 112a perform LCP negotiation and authentication, step 302, in accordance with steps 202 to 212 illustrated in FIG. 2. In accordance with the L2TP, the service node 112a receives the tunnel establishment parameters 212a, 212b, 212c and 212d, and can proceed to the establishment of a tunnel with the LNS 116. The service node 112a thus sends to the LNS 116 a "start control connection request" message 304 specifying the service node's 112a host name as well as the tunnel ID parameter 212d assigned to the tunnel being established. The LNS 116 replies with a "start control connection reply" message 306, specifying the LNS's 116 own host name 212b and the assigned tunnel ID parameter 212d. The service node 112a sends back a "start control connection connected" message 308 and once the control connection is brought up, establishes the L2TP tunnel 312 with the LNS 116, via an "incoming call request" message 310.

The L2TP tunnel 312 is a PPP connection as prescribed by the tunnel type parameter 212a. The "incoming call request" message 310 specifies the assigned tunnel ID parameter 212d of the L2TP tunnel 312. The LNS 116 responds with an "incoming call reply" message 314, as well specifying the assigned tunnel ID parameter 212d of the L2TP tunnel 312. The service node 112a sends an L2TP "incoming call connected" message 316 to confirm the successful establishment of the L2TP tunnel 312 with the LNS 116.

From thereon, the service node 112a only acts as a transparent forwarding router between the mobile station 102 and the LNS 116 and is referred to as a L2TP access concentrator (LAC). Traffic is thus encapsulated and forwarded through the L2TP tunnel 312 to and from the mobile station 102 and the LNS 116. The service node 112a, or LAC, sends to the AAA 114 an "account request" message 318, such that accounting may be performed by the AAA server 114 during service provision.

The LNS 116 then proceeds to the establishment of a PPP connection 322 with the mobile station 102, via the service node 112*a*. In order to do so, the LNS 116 performs the same actions performed by the service node 112*a* when the latter initiated the establishment of a PPP connection 224 with the mobile station 102. The LNS 116 hence performs LCP negotiation, authentication and IPCP negotiation with the mobile station 102, step 320, in a similar manner as steps 202 to 224 illustrated In FIG. 2, wherein parameters 212*a*, 212*b*, 212*c* and 212*d* are not included in the "access accept" message 212. The mobile station 102 is thereby assigned an address. The AAA 114 differentiates when the "access request" message 210 originates from the service node 112*a* or the LNS 116, as the tunnel establishment parameters 212*a*, 212*b*, 212*c* and 212*d* are not included in the "access accept" message 212 in the latter case.

Several BSCs/PCFs 108*a*, 108*b* and 108*c* can be associated with a single service node 112*a* or 112*b*, such that a mobile station 102 may be communicating with a different BSC/PCF 108*a*, 108*b* or 108*c* depending on its location in the packet data cellular telecommunication network's 100 coverage area. Referring now back to FIG. 1, if at some point, the mobile station 102 is in the vicinity of a first BSC/PCF 108*a* and subsequently moves in the vicinity of a second BSC/PCF 108*b*, the quality of service provision to the mobile station 102 is properly maintained. Indeed, communication between the mobile station 102 and the packet data cellular telecommunication network 100 resumes via BSC/PCF 108*b*.

In the event that the mobile station 102 is engaged in a tunneled PPP connection with the LNS 116 via the service node 112*a*, no problems occur in the aforementioned scenario providing that both BSCs/PCFs 108*a* and 108*b* are associated with the same service node 112*a*. The established tunnel between the service node 112*a* and the LNS 116 is maintained and service provision resumes following a handoff of the radio connection from the first BSC/PCF 108*a* to the second BSC/PCF 108*b*.

However, problems may occur in the following scenario for a mobile station 102 involved in a tunneled PPP connection with the LNS 116. Indeed, whenever the mobile station 102 moves from a first coverage area 120*a* served by a first service node 112*a* to a second coverage area 120*b* served by a second service node 112*b* in the packet data cellular telecommunication network 100, the establishment of a new connection between the mobile station 102 and the second service node 112*b* is initiated. As this new connection is extended to the LNS 116 via said second service node 112*b*, the mobile station 102 is assigned a new address by the LNS 116. This results in a loss of connectivity for the mobile station 102 since the LNS 116 still sends information intended for the mobile station 102 via the first service node 112*a*.

The aforementioned discrepancy is provoked by the fact that the LNS 116 does not recognize the mobile station 102 when the latter establishes a new connection with the LNS 116 via the second service node 112*b* following the mobile station's 102 entry in the coverage area 120*b* of said service node 112*b*. Indeed, the LNS 116 has no means available for determining that a service node handoff has occurred between service nodes 112*a* and 112*b* and that the mobile station 102 has been assigned a new address. The LNS 116 can consequently not maintain proper communication with the mobile station 102.

The information sent via the first service node 112*a* is indeed never received by the mobile station 102, which is assigned a new address upon the establishment of a new connection with the LNS 116 via the second service node 112*b*. Moreover, the sent information results in unnecessary traffic in the packet data cellular telecommunication network 100. This constitutes inefficient bandwidth management, as the connection between the first service node 112*a* and the LNS 116 is not removed immediately but only after the expiration of a timeout, or a predetermined time interval.

Although a HA, as in the context of Mobile IP networks, could be a solution such as to ensure proper delivery to the mobile station 102 in the aforementioned scenario, it represents a costly solution. According to a preferred embodiment of the present invention, the LNS 116 is provided with means to monitor whether the mobile station 102 is already involved in a previous session with the LNS 116 via a previous service node 112*a* upon entering the coverage area 120*b* of another service node 112*b*. The LNS 116 recognizes the mobile station 102 and reassigns to the latter its original address.

Figure 4:
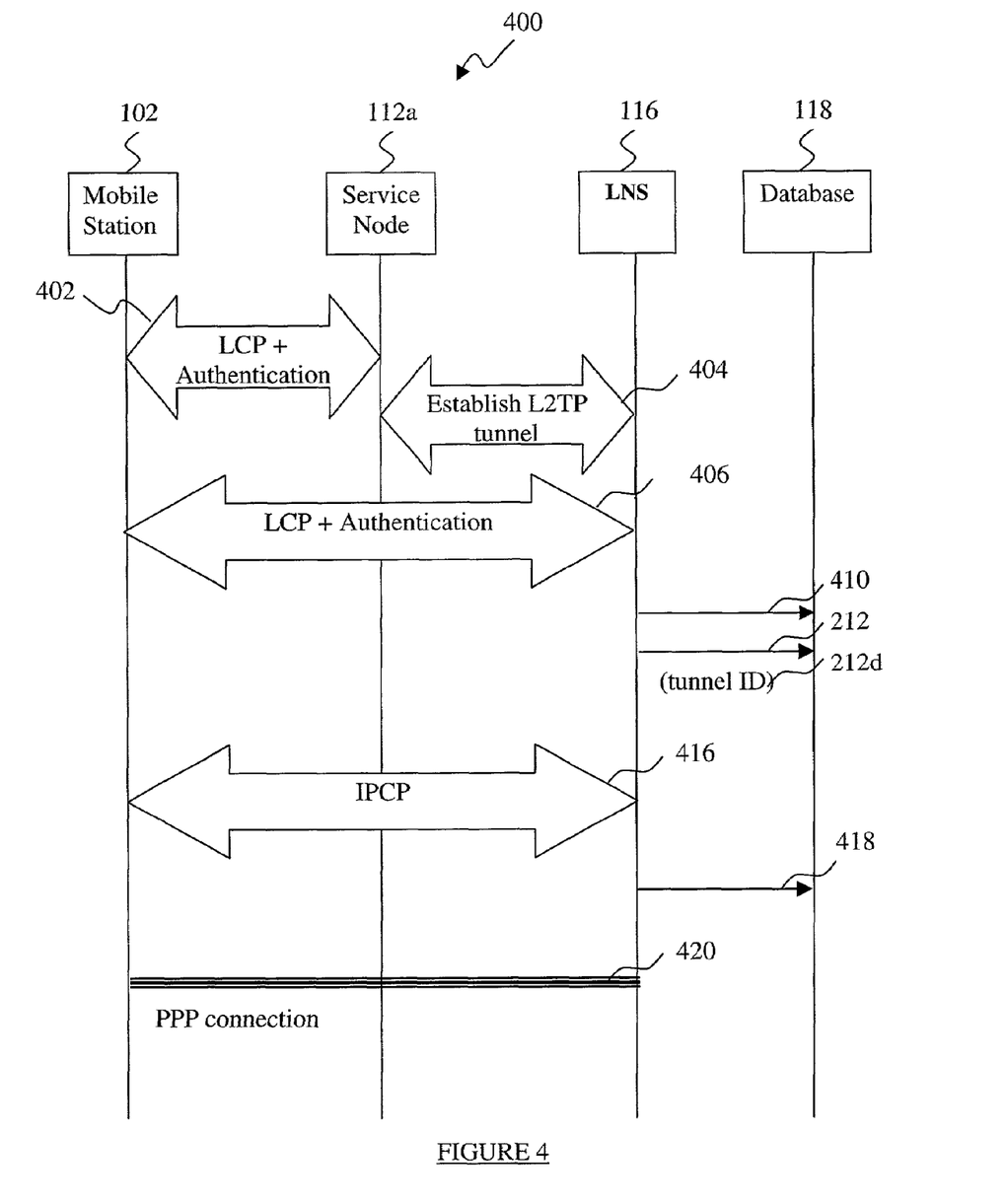
FIG. 4 is a signaling diagram illustrating the establishment of a tunneled PPP connection between a mobile station and a terminal node in a packet data cellular telecommunication network in accordance with a preferred embodiment of the invention.

Such a scenario is rendered possible by the present invention. Reference is now as well made to FIG. 4, wherein there is shown a signaling diagram illustrating the establishment 400 of a tunneled PPP connection between a mobile station and a terminal node in a packet data cellular telecommunication network in accordance with a preferred embodiment of the invention.

A mobile station 102 performs LCP negotiation and authentication, step 402, in accordance with steps 202 to 214 illustrated in FIG. 2, with a first service node 112*a*. The service node 112*a* then establishes a L2TP tunnel with the LNS 116, step 404, in accordance with steps 304 to 318 illustrated in FIG. 3. The LNS 116 then in turn performs LCP negotiation and authentication of the mobile station 102, step 406, in accordance with step 302 illustrated in FIG. 3, to initiate the establishment of a tunneled PPP connection 420 with the mobile station 102, via the service node 112*a*.

During the registration phase of authentication, the LNS 116 stores the mobile station's 102 username 410 in a co-located database 118. The tunnel ID parameter 212*d* is as well stored. The LNS 116 assigns an available address 418 to the mobile station 102 during the IPCP phase in step 416, performed in accordance with steps 216 to 222 illustrated in FIG. 2. The LNS 116 stores this assigned address 418 in the co-located database 118. Can thus be associated in the co-located database 118 the mobile station's 102 username 410, IP address 418 and the tunnel ID parameter 212*d* associated with the mobile station's 102 connection with the LNS 116. At this point, the LNS 116 establishes the PPP connection 420 with the mobile station 102 via the first service node 112*a*.

Figure 5:
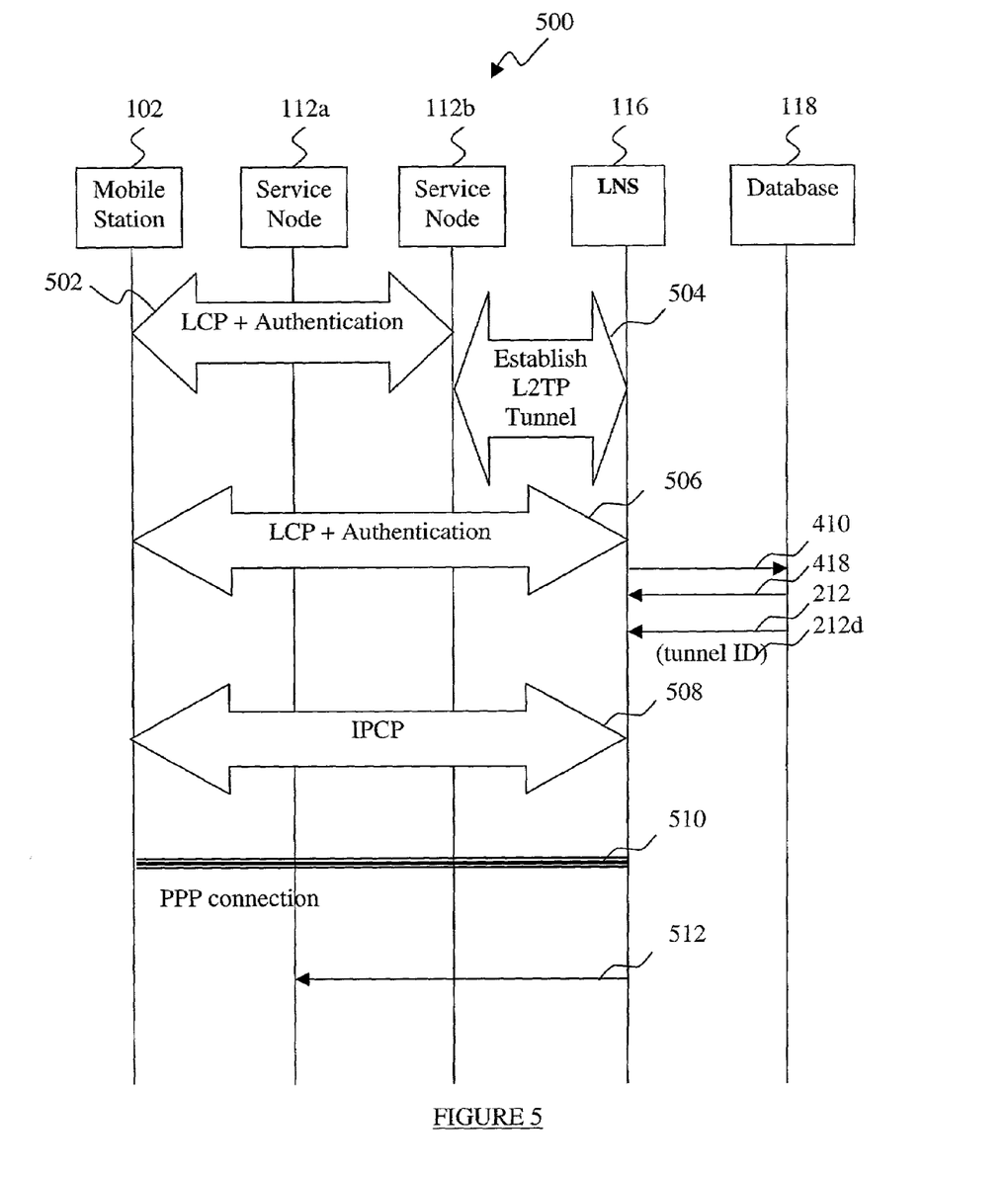
FIG. 5 is a signaling diagram illustrating a method for performing enhanced mobility management in a packet data cellular telecommunication network in accordance with a preferred embodiment of the invention.

Reference is now as well made to FIG. 5, wherein there is shown a signaling diagram illustrating a method for performing enhanced mobility management in a packet data cellular telecommunication network in accordance with a preferred embodiment of the invention.

Assuming now that the mobile station 102 transits from the coverage area 120*a* of the first service node 112*a* to the coverage area 120*b* of the second service node 112*b*, the mobile station 102 initiates the establishment of a connection with the second service node 112*b* following step 502, in accordance with steps 202 to 214 illustrated in FIG. 2. The second service node 112*b* then proceeds to the establishment of a tunnel with the LNS 116, step 504, in accordance with step 302 illustrated in FIG. 3. The LNS 116 then in turn performs LCP negotiation and authentication of the mobile station 102, step 506, still in accordance with step 302 illustrated in FIG. 3, to initiate the establishment of a tunneled PPP connection 510 with the mobile station 102, via the second service node 112b.

According to a preferred embodiment of the invention, the LNS 116 queries the co-located database 118 with the mobile station's 102 username 410 to check whether the mobile station 102 is already listed as being registered via another service node 112a with the LNS 116. If such is the case, the LNS 116 retrieves the mobile station's 102 address 418 from the co-located database 118 and reassigns this address 418 to the mobile station 102 at the new coverage area 120b. This specific address 418 reassignment occurs during step 508, performed in accordance with steps 216 to 222 of FIG. 2, wherein message 218 includes the address 418 to be reassigned to the mobile station 102.

The LNS 116 as well retrieves from the co-located database 118 the tunnel ID parameter 212d (of the previously established tunnel) associated with the mobile station 102 in order to terminate the connection associated with said parameter. Moreover, the tunnel established between the LNS 116 and the first service node 112a, is terminated by the LNS 116 sending a "tunnel termination" message 512 to the first service node 112a. The LNS 116 thus terminates the first tunnel associated with the tunnel ID parameter 212d retrieved from the co-located database 118 and associated with the coverage area 120a in which the mobile station 102 was previously located.

The LNS 116 is consequently automatically aware that the mobile station 102 is to be contacted via service node 112b and that no more information intended for the mobile station 102 should be sent to the first service node 112a. The mobile station 102 thus remains continuously connected with the LNS 116 despite the tunnel reestablishment between the second service node 112b and the LNS 116, without information being mistakenly sent to the first service node 112a.

To achieve this deed, the LNS 116 manages a local database 118, such as a dynamic mapping table, to verify existing associations between the mobile station's 102 username 410, IP address 418 and tunnel ID parameter 212d, to enable efficient inter-PDSN handoff in the context of Simple IP when L2TP tunneling is performed. In the event that the mobile station is previously not registered via another service node 112a, standard tunnel establishment procedures prevail in accordance with the signaling of FIG. 3.

Figure 6:
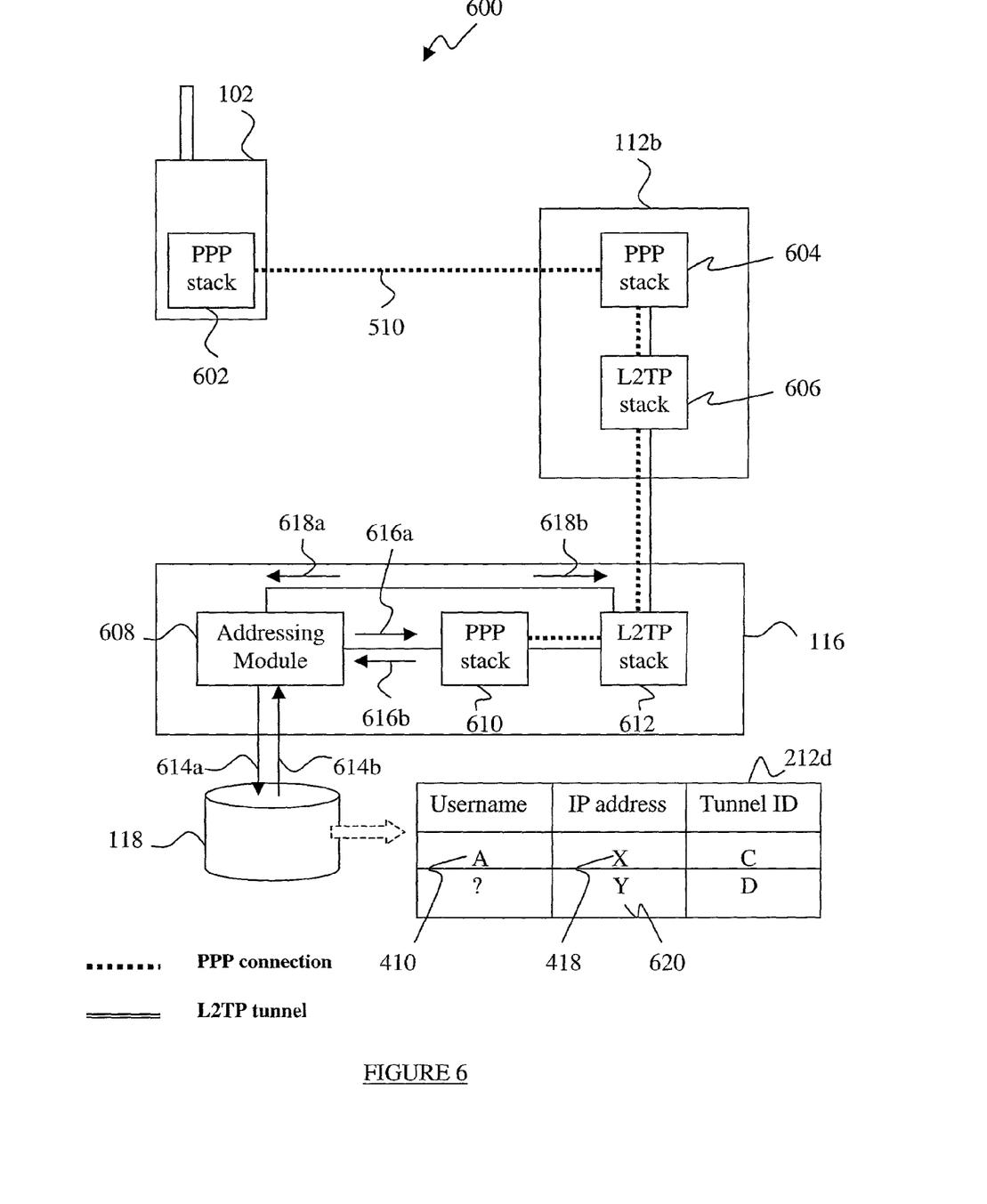
FIG. 6 is an illustration of the network components involved and the signaling interactions between them for performing enhanced mobility management in a packet data cellular telecommunication network in accordance with a preferred embodiment of the invention.
Figure 7:
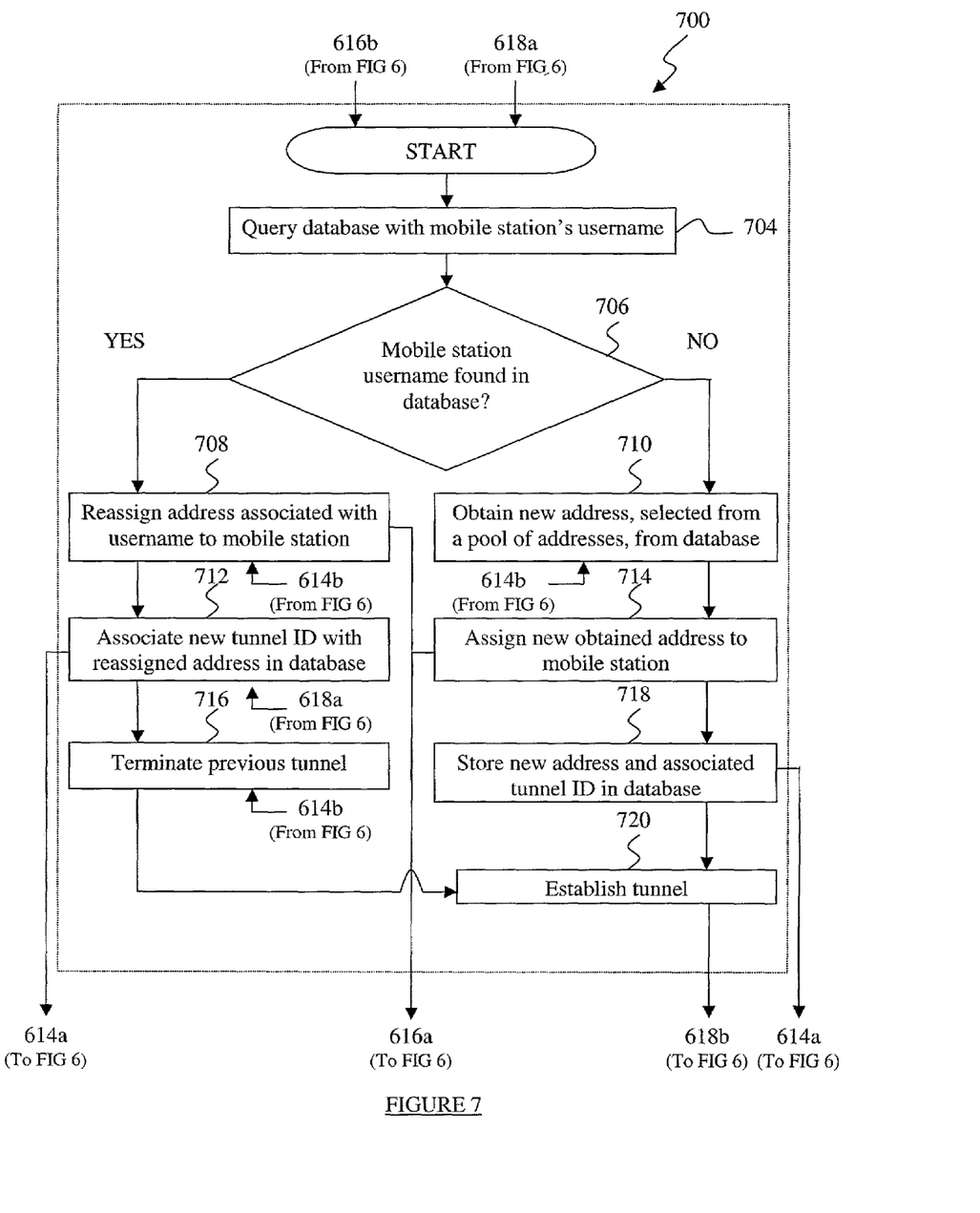
FIG. 7 is a flowchart diagram illustrating an exemplary procedure for performing enhanced mobility management in a packet data cellular telecommunication network in accordance with a preferred embodiment of the invention.

Reference is now as well made to FIGS. 6 and 7, wherein there is respectively shown an illustration of the network components 600 involved and the signaling interactions between them for performing enhanced mobility management in a packet data cellular telecommunication network in accordance with a preferred embodiment of the invention, and a flowchart diagram 700 illustrating an exemplary procedure for performing enhanced mobility management in a packet data cellular telecommunication network also in accordance with a preferred embodiment of the invention.

The mobile station 102 includes a PPP stack 602 for establishing a PPP connection 510 with the LNS 116, which as well comports a PPP stack 610. The service node 112b, which acts as a transparent router, also possesses a PPP stack 604. Both the LNS 116 and said service node 112b include a L2TP stack, respectively 612 and 606. When IP packets are tunneled between the LNS 116 and the service node 112b, a L2TP header is added to the packets by the L2TP stacks 612 and 606, the latter removing said L2TP header from said packets once tunneling is completed and packets exit the tunnel.

The LNS 116 further comprises an addressing module 608 to manage the addresses of mobile stations it communicates with. This addressing module 608 interacts with the aforementioned PPP and L2TP stacks 610 and 612, as well as with the database 118, to allow for enhanced mobility management in accordance with a preferred embodiment of the present invention. The database 118 may be a memory within the LNS 116, a distributed database or a centralized database external to the LNS 116. FIG. 6 represents the database as an external database 118 co-located with the LNS 116, in accordance with a preferred embodiment of the invention.

Upon the establishment of a PPP connection 510 between the mobile station 102 and the LNS 116, the LNS 116 assigns an address 418 to the mobile station 102. The LNS' PPP stack 610 assigns this address 418 to the mobile station 102 and sends the address 418, along with the mobile station's 102 username 410, to the addressing module 608, message 616b, so that the addressing module 608 may store these parameters 418 and 410 in the database 118 via message 614a. The LNS' L2TP stack 612 sends, via message 618a, the tunnel ID parameter 212d to the addressing module 608 following the establishment of a tunnel. This information is as well stored in the database 118, via message 614a, and associated with the aforementioned mobile station 102 username 410 and address 418.

Upon the mobile station 102 transiting and registering in the coverage area 120b of the service node 112b to establish a PPP connection 510 with the LNS 116 via service node 112b, the addressing module 608 queries the database 118, step 704, and checks via message 614a, step 706, if the username 410 of the mobile station 102 is already listed in the database 118.

If such is the case, the addressing module 608 retrieves via message 614b the address 418 and the tunnel ID parameter 212d associated with the username 410. The username 410 is sent via message 616a to the PPP stack 610 so that it may be reassigned, step 708, to the mobile station 102 upon the establishment of the PPP connection 510. The tunnel ID parameter 212d associated with the previous tunnel is sent via message 618b to the L2TP stack 612 so that the latter terminates said tunnel, step 716. The addressing module 608 as well stores in the database 118, step 712 via message 614a, the new tunnel ID parameter 212d obtained from the L2TP stack 612 via message 618a during the establishment of the PPP connection 510 via the second service node 112b. Finally, the L2TP stack 612 establishes a tunnel, step 720, with the service node's 112b L2TP stack 606 before the establishment of the PPP connection 510.

In the event that the mobile station 102 is not listed in the database 118, the addressing module 608 retrieves an available address 620 from the database 118 via message 614b, step 710. This address 620 is sent to the PPP stack 610 so that it can be assigned to the mobile station 102, step 714, via message 616a, upon the establishment of the PPP connection 510. The L2TP stack 612, via message 618a, informs the addressing module 608 of the updated tunnel ID parameter 212d so that it may be associated with the new mobile station address 620 in the database 118 via message 614a, step 718. Finally the L2TP stack 612 establishes a tunnel, step 720, with the service node's 112b L2TP stack 606 before the establishment of the PPP connection 510.

Simple IP can now perform enhanced mobility management as loss of connectivity due to inefficient address management in inter-PDSN handoffs is eliminated. Moreover, this scheme presents a simple way to enhance Simple IP without the addition of a node such as a HA to keep track of the mobile. This prevents tunnels from being uselessly maintained (inefficient use of bandwidth) between a mobile station and the original PDSN prior to inter-PDSN handoff, tunnels which were removed only following the expiration of a timeout.

It is thus believed that the operation and construction of the present invention will be apparent from the foregoing description. While the method and system shown and described has been characterized as being preferred, it will be readily apparent that various changes and modifications could be made therein without departing from the spirit and scope of the invention as defined in the following claims.

What is claimed is:

1. A method for performing mobility management in a communication network, said method comprising the steps of:
    establishing a connection between a mobile station and a first service node in the communication network;
    extending the established connection from the first service node to a terminal node in the communication network;
    upon an establishment of a tunneled Point-to-Point Protocol (PPP) connection between the mobile station and the terminal node via the first service node, assigning at the terminal node a unique address to the mobile station, said address associated with the mobile station and the tunneled PPP connection established between the mobile station and the terminal node via the first service node; and
    upon roaming of the mobile station connected to the first service node from the coverage area of the first service node to the coverage area of a second service node in the communication network, ensuring continuous connectivity between the mobile station and the terminal node by:
        establishing a new connection between the mobile station and the second service node;
        extending the established new connection from the second service node to the terminal node;
        verifying at the terminal node whether the unique address assigned to the mobile station is associated with a prior connection with the terminal node via the first service node; and
        upon determining that the unique address assigned to the mobile station is associated with a prior connection with the terminal node via the first service node, reassigning at the terminal node the unique address to the mobile station upon an establishment of a new tunneled PPP connection between the mobile station and the terminal node via the second service node, said address associated with the mobile station and the new tunneled PPP connection established between the mobile station and the terminal node via the second service node; and
    terminating the tunneled PPP connection between the mobile station and the terminal node via the first service node, whereby performing mobility management for the mobile station in the communication network.

2. The method as in claim 1, wherein mobility management provides services to the mobile station in accordance with the level of quality to which the mobile station has subscribed to, regardless of its position in the communication network.

3. The method as in claim 1, wherein the service nodes can consist of any network element such as a router, a switch or a cellular telecommunication service node.

4. The method as in claim 1, wherein the coverage area of the service nodes can be the coverage area of any network element such as a router, a switch or a cellular telecommunication service node.

5. The method as in claim 1, wherein the communication network can be one of a cellular telecommunication network, a data network, an internet network or a private network.

6. The method as in claim 1, wherein the extending of the established connection from the service nodes to the terminal node is performed by:
    acquiring at the service nodes at least one parameter for establishing a connection between the service nodes and the terminal node; and
    establishing the connection between the service nodes and the terminal node in accordance with the at least one acquired parameter.

7. The method as in claim 6, wherein the at least one parameter is acquired from a database in the communication network.

8. The method as in claim 7, wherein the database is co-located with the terminal node in the communication network.

9. The method as in claim 7, wherein the database is co-located with one of the service nodes in the communication network.

10. The method as in claim 6, wherein the at least one parameter can be one of a connection type parameter, a server endpoint address and a connection assignment identification number.

11. The method as in claim 1, wherein the verifying step is performed by querying a database in the communication network.

12. The method as in claim 11, wherein the database is co-located with the terminal node.

13. The method as in claim 11, wherein the database is co-located with one of the service nodes in the communication network.

14. The method as in claim 11, wherein the database includes at least one parameter such as a mobile identification number, a mobile station address, a username, a password, a connection type parameter, a server endpoint address and a connection assignment identification number.

15. The method as in claim 1, wherein:
    the mobile station accesses the communication network over an air interface in accordance with the CDMA2000 protocol;
    the communication network is a cellular telecommunication network that supports the Simple IP protocol;
    the establishment of the connection from the service node to the terminal node is performed in accordance with L2TP tunneling protocol;
    the connections are Point-to-Point Protocol (PPP) connections;
    the addresses are IP addresses; and
    the service nodes are Packet Data Service Nodes.

16. A terminal node for communicating with a mobile station via first and second service nodes, the first service node having a first coverage area and communications capability for establishing a connection with the mobile station, the second service node having a second coverage area and communications capability for establishing a new connection with the mobile station upon roaming of the mobile station from the coverage area of the first service node into the coverage area of the second service node, the terminal node comprising:

communications capability for establishing connections with the first and second service nodes;

an addressing module for
assigning a unique address to the mobile station upon establishment of a tunneled Point-to-Point Protocol (PPP) connection between the mobile station and the terminal node via the first service node; and verifying whether, upon establishment of a new tunneled PPP connection between the mobile station and the terminal node via the second service node, the mobile station already has assigned thereto the unique address for the connection via the first service node, and if so reassigning the unique address to the mobile station for the new tunneled PPP connection established to the terminal node via the second service node.

17. The terminal node as in claim 16, wherein the service nodes can consist of any network element such as a router, a switch or a cellular telecommunication service node.

18. The terminal node as in claim 16, wherein the coverage area of the service nodes can be the coverage area of any network element such as a router, a switch or a cellular telecommunication service node.

19. The terminal node as in claim 16, comprising: a PPP stack for: establishing and terminating connections with the mobile station; assigning the unique address to the mobile station; and a L2TP stack for establishing and terminating connections with the service nodes in accordance with at least one acquired parameter.

20. The terminal node as in claim 19, wherein the at least one parameter is acquired from a database in the communication network.

21. The terminal node as in claim 20, wherein the database is co-located with one of the service nodes.

22. The terminal node as in claim 20, wherein the database is co-located with the terminal node.

23. The terminal node as in claim 20, wherein the database includes at least one parameter such as a mobile identification number, a mobile station address, a username, a password, a connection type parameter, a server endpoint address and a connection assignment identification number.

24. The terminal node as in claim 16, wherein:
the terminal node establishes a connection with a mobile station accessing a communication network over an air interface in accordance with the CDMA2000 protocol;

the terminal node is in a cellular telecommunication network that supports the Simple P protocol;

the establishment of the connection from the service nodes to the terminal node is performed in accordance with L2TP tunneling protocol;

the connections are Point-to-Point Protocol (PPP) connections;

the addresses are IP addresses; and the service nodes are Packet Data Service Nodes.

* * * * *